United States Patent [19]

Panetta

[11] Patent Number: 4,466,260

[45] Date of Patent: Aug. 21, 1984

[54] ANTITHEFT DEVICE FOR TRAILERS AND SEMITRAILERS

[75] Inventor: Domenico Panetta, Cesano Boscone, Italy

[73] Assignee: Unifilter di D. Panetta, Italy

[21] Appl. No.: 370,149

[22] Filed: Apr. 28, 1982

[30] Foreign Application Priority Data

May 4, 1981 [IT] Italy .............................. 21499 A/81

[51] Int. Cl.³ .......................... F16C 3/00; E05B 65/12
[52] U.S. Cl. ....................................... 70/181; 70/228; 70/255; 70/256
[58] Field of Search ................. 70/228, 225, 237, 238, 70/239, 255, 256, 181; 188/24.18, 265

[56] References Cited

U.S. PATENT DOCUMENTS 2,734,590 2/1956 Hays .................................... 188/265
3,557,584 1/1971 Triglia ................................... 70/228
3,973,805 8/1976 Stevenson ........................... 188/265

FOREIGN PATENT DOCUMENTS 16991 of 1909 United Kingdom ................. 70/228

Primary Examiner—Robert L. Wolfe
Attorney, Agent, or Firm—Darby & Darby

[57] ABSTRACT

The invention relates to an antitheft device for trailers and semitrailers comprising a threaded rod which can be screwed in a block integral to a fixed portion of the trailer or semitrailer and having one end thereof idly engaged in a body integral to a linkage leading to the levers which actuate the brakes of an axle of the trailer or semitrailer. By screwing or unscrewing the threaded rod in said block it is possible to achieve the locking or the releasing of brakes. When brakes are in their locking position, acting on a latch control member operable by means of a key it is possible to engage one end of the latch within an annular groove formed in the threaded rod, so that the latter is prevented from moving axially. During this stage the other end of the latch acts on a non-return valve connected to the service brake circuit in order to allow the brake fluid to flow in one direction only.

4 Claims, 5 Drawing Figures

ANTITHEFT DEVICE FOR TRAILERS AND SEMITRAILERS

The present invention relates to an antitheft device for trailers and semitrailers.

Many antitheft devices of different kinds are at present on the market. Some take into consideration the locking of the steering, others the break of the electric circuit or the locking of the brake circuit. However they all can be applied to self-traction vehicles. On the contrary, in the case of vehicles pulled by a tractor an efficient antitheft device adapted to protect them against ill-intentioned persons has not yet been found. In fact, as trailers and semitrailers are often parked far away from their trailing means, maybe for long periods, it often happens that they are at the mercy of ill-intentioned persons who without too much labour succeed in taking them away by means of an appropriate trailing means.

The main object of the present invention is to obviate the above mentioned drawbacks embodying an antitheft device which is able to ensure an efficient locking action also to trailers and semitrailers at least similar to that granted by known antitheft devices to self-traction vehicles.

A further object of the invention is to ensure the availability of an antitheft device which can be adapted for all kinds of trailers and semitrailers and is at the same time easy to put into practice and cheap.

These and other objects which will become more evident from the description which follows are attained, according to the present invention, by an antitheft device for trailers and semitrailers which is characterized in that it comprises a threaded rod which can be screwed in a threaded hole formed in a block integral to a fixed portion of the trailer or semitrailer and having one end thereof idly engaged within a recess formed in a body rigidly connected to the median portion of a traverse pivoted, at the two ends thereof, on the ends of a pair of tie rods, the other ends of these tie rods being connected to corresponding levers which actuate the brakes connected to an axle of the trailer or semitrailer, said tie rods being freely slidable according to a reciprocating motion within two respective tubular guides integral to the fixed portions of the trailer or semitrailer, said antitheft device also comprising a non-return valve connected to the service brake circuit and a latch control member operable by a key or the like, which simultaneously acts on the threaded rod and on the nonreturn valve, locking, in one position thereof, the axial sliding of the threaded rod in the block and the brake circuit and restoring, in a second position thereof, the possibility of sliding of the threaded rod and the brake circuit.

Advantageously, said threaded rod is provided at its median portion with an annular groove into which one end of the latch is designed to be fitted under conditions of braking in action; at the same time the other end of said latch is in a position suitable to allow the brake fluid to flow in one direction only.

Further features and advantages of the invention will best be understood from the detailed following description of a preferred illustrative embodiment of an antitheft device for trailers and semitrailers given hereinafter, by way of example only, with reference to the accompanying drawings in which.

Figure 1:
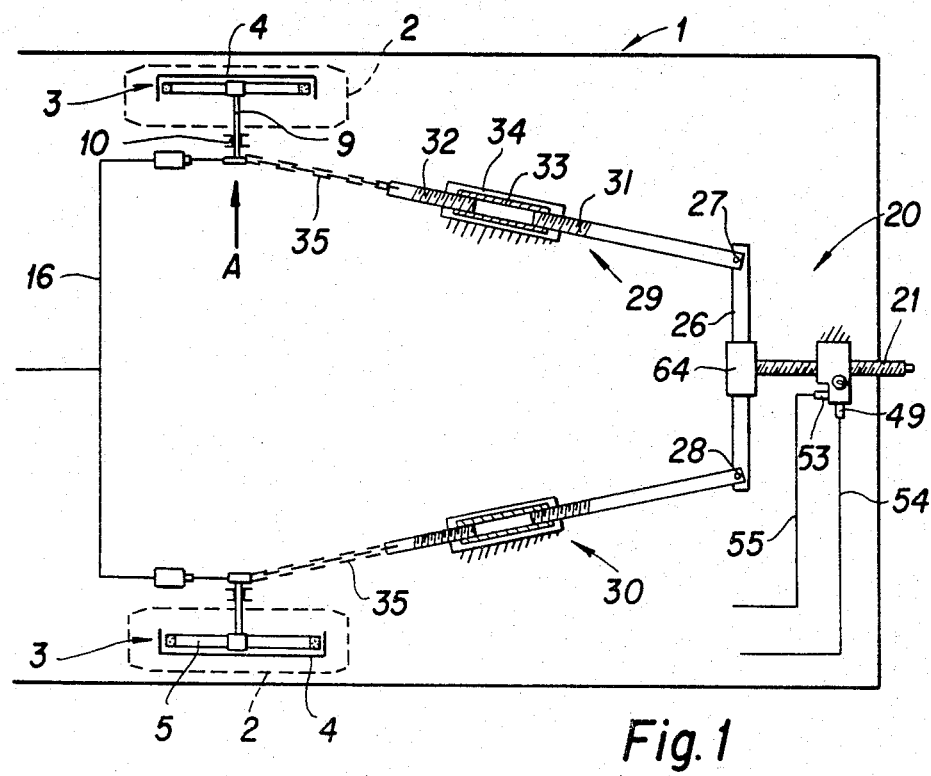
FIG. 1 is a plan diagrammatic view of the antitheft device according to the invention.

Referring to the drawings and particularly to FIG. 1 it is diagrammatically indicated at 1 the rear of a trailer or semitrailer. There are clearly shown the two wheels 2 provided with their respective brakes generally indicated at 3.

Figure 5:
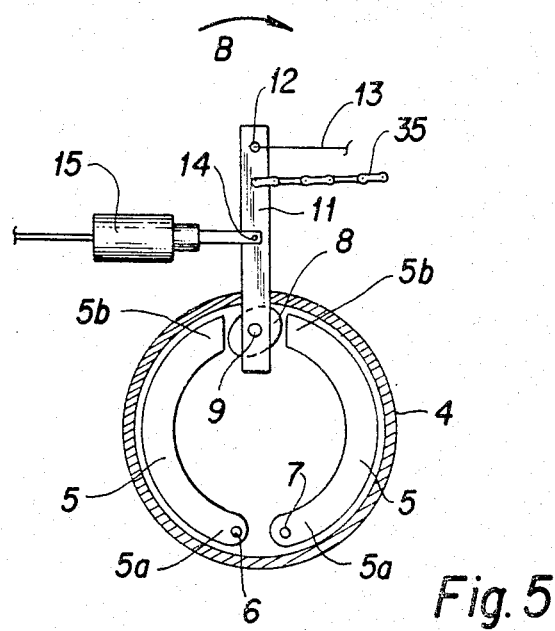
FIG. 5 is a side view according to the arrow A of FIG. 1 of the brake lever to which the device according to the present invention is applied.

Each brake 3 includes a drum rotating with the wheel 2 and a pair of shoes 5 which, at one end thereof 5a, are pivoted on 6 and 7 (FIG. 5). The other ends 5b of the shoes 5 are in contact with a cam 8 mounted on one end of a rod 9 which rotates in a fixed support 10 and is connected at its opposite end to a lever 11 suitable to actuate the brakes 3. Owing to the support 10, the lever 11 can swing about the axis of rod 9 so that, under braking conditions, shoes 5 press against the inner surface of drum 4.

Referring to FIGS. 1 and 5, the rod 11 is connected at 12 to the end of a tie rod 13 the other end of which is connected to the parking brake lever of the vehicle not shown in the figures. In addition, each lever 11 is connected at 14 to the piston of a master cylinder 15 of a trailer or semitrailer service brake circuit 16.

Figure 2:
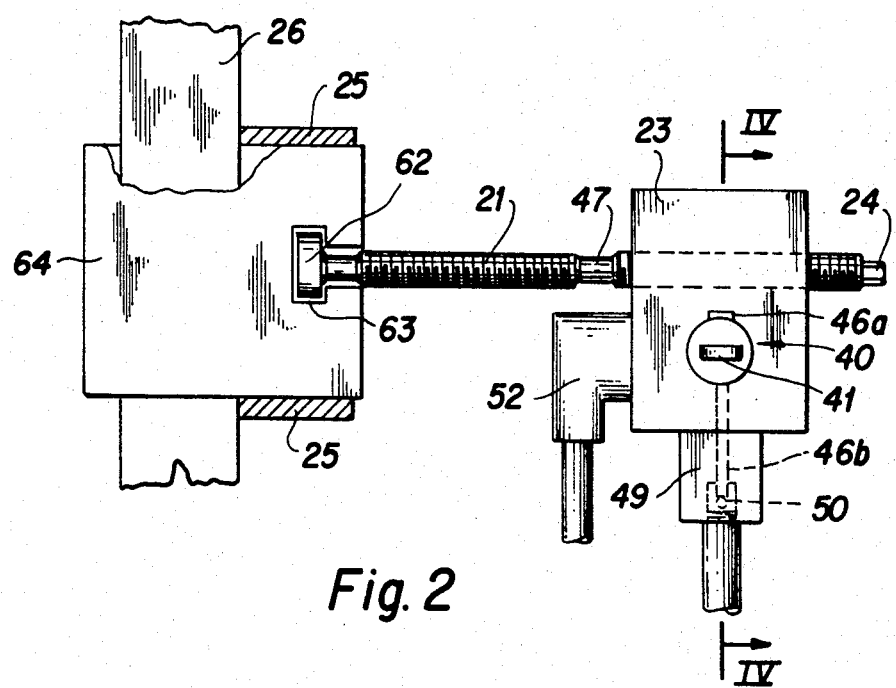
FIG. 2 shows, on an enlarged scale, the latch control member in a released position, the threaded rod being free to axially move in its support block.
Figure 3:
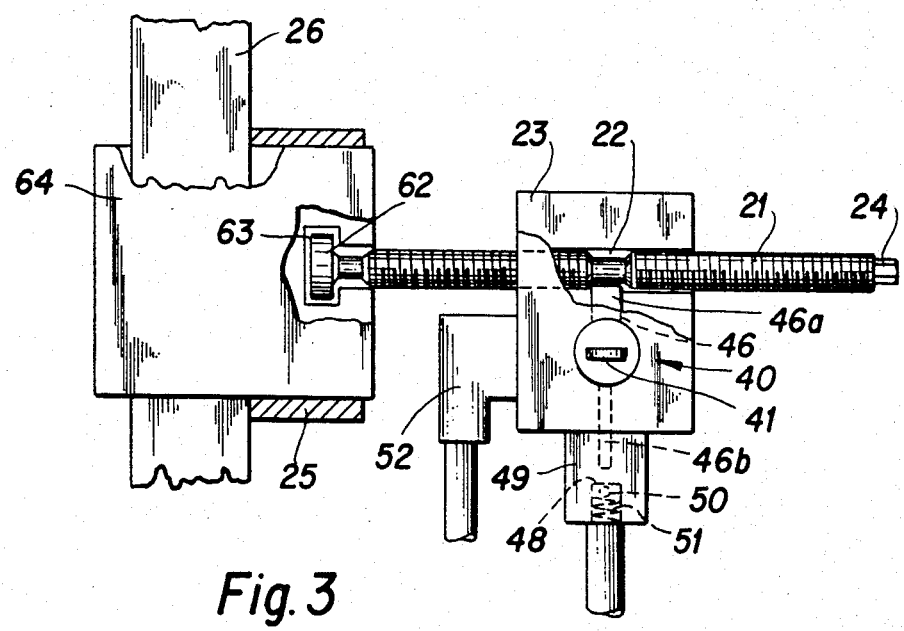
FIG. 3 is a view similar to FIG. 2 with the threaded rod in a pulling position and the latch of the control member fitted in, to prevent the axial dispacement thereof.

According to the present invention the antitheft device for trailers and semitrailers generally indicated at 20 comprises a threaded rod 21 which can be screwed within a threaded hole 22 formed in a block 23 integral to a fixed portion of a trailer or semitrailer, for example the frame or the body (FIGS. 1, 2 and 3).

The threaded rod 21 is provided at one end thereof, with a polygonal-section head 24 suitable to get engaged by a wrench for the manual operation of the device 20. At its opposite end, the threaded rod 21 is provided with a cylindrical enlargement 62 located in a recess 63 formed in a body 64 which for example may comprise two facing portions joined together by a pair of welded plates.

Also secured to the body 64, in its median portion, is a traverse 26 on the two ends of which are pivoted, at 27 and 28 respectively, the ends of a pair of tie rods, generally indicated at 29 and 30, the other ends of these tie rods being connected to the brake levers 11.

Each tie rod 29 and 30 comprises a first and a second threaded rod, 31 and 32 respectively, which are joined together by means of an adjustment sleeve 33 provided with an internal thread. The sleeve 33 and partly the rods 31 and 32 are located within a tubular guide 34 in which they can axially slide and which is integral to a fixed portion of a trailer or semitrailer.

At the end of the rod 32 which is not fitted into the sleeve 33 is fixed an end ring of a chain 35, the other end of which is pivoted on the lever 11 controlling the operation of brakes 3.

Figure 4:
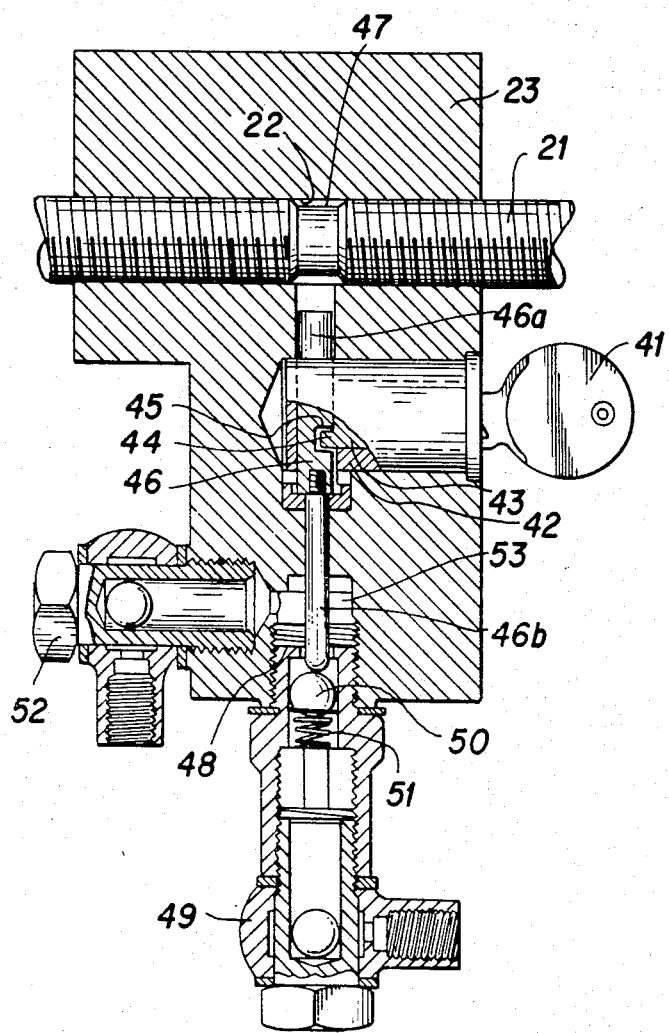
FIG. 4 is a sectional view on line IV-IV of FIG. 2 of the latch control member.

Referring particularly to FIGS. 2, 3 and 4, the antitheft device according to the invention comprises a latch control member generally indicated at 40 and operable by a key 41 or the like. This control member, known in itself, essentially includes a fixed cylindrical jacket 42 in which is located a cylinder 43 suitable to rotate by means of said key 41 and provided at its inner end with an eccentric pin 44. The pin 44 engages in a hollow 45 transversely formed in a latch 46 slidable within a corresponding housing obtained partly in the jacket 42 and partly in the block 23, at right angles to the threaded hole 22. One end 46a of the latch 46 is arranged to be fitted, when the device is in a braking position, into an annular groove 47 formed in the median portion of the threaded rod 21. The other end 46b of latch 46 is fitted into the inlet hole 48 of a conventional non-return valve 49, known in itself, formed from a ball 50 provided with a corresponding spring 51. Furthermore, a pipe fitting 52 is screwed in the block 23 so that it is laterally in fluid communication with the bore 53 defined inside the block 23 itself. The valve 49 and the pipe fitting 52 are connected to two corresponding pipe lengths 54 and 55 which have to be connected, in a manner known to the man of the art, to the feeding ciruit of the brake fluid.

Therefore the antitheft device according to the invention has a double safety degree as it acts both independently, through the tie rods 29 and 30, and on the service brake circuit.

The operation of the antitheft device described above is very easy. Referring to FIG. 2, which corresponds to the running condition of a vehicle in which brakes are of course released, it is necessary to act, by means of a wrench or the like, on the head 24 of the threaded rod 21 so that the same rod can axially move towards the right with reference to the figures. The movement of the threaded rod 21 causes a shifting of the traverse 26 and of the tie rods 29 and 30 which cause the levers 11 to rotate in the direction shown by the arrow B in FIG. 5.

When the rotation of levers 11 has reached such a degree that it causes the lockage of the shoes 5 on the drums 6, if the adjustment of the tie rods 29 and 30 has been done correctly, the annular groove 47 of the threaded rod 21 will be in line with the latch 46. At this point, by rotating the key 41 of the control member 40, the ends 46a of latch 46 will penetrate into the groove 47 of the threaded rod 21 (FIG. 3). At the same time the other end 46b of latch 46 will be in such a position to allow the ball 50 of the non-return valve 49 to close the hole 48 through which the brake fluid passes. In this way the latter will be able to flow in one direction only, so that once the brake control pedal has been depressed, the brakes can no more be released.

When the running conditions of a trailer or semitrailer have to be restored it is necessary to insert the key 41 in the control member 40 causing its rotation in the opposite direction so that the latch 46 carries out a displacement, pushing the ball 50 inside the non-return valve 49 by its end 46b and clearing the annular groove 47 of the threaded rod 21 by its end 46a. At this point the service brake is released but it is still necessary to act manually on the threaded rod 21 by means of a wrench or the like causing the traverse 26 and the lie rods 29 and 30 to displace towards the left with reference to the drawings so that levers 11 are brought back to the position of FIG. 5 corresponding to a situation of brake releasing.

The invention herein described may be embodied in other specific forms and modifications can be carried out without departing from the spirit or essential characteristics thereof.

I claim:

1. An antitheft device for trailers and semitrailers provided with an axle, brakes connected to said axle and a service brake circuit for actuating said brakes, characterized in that it comprises a traverse having two spaced apart fixed portions, an axially movable threaded rod which can be screwed in a threaded hole formed in a block integral to a fixed portion of the trailer or semitrailer and having one end thereof idly engaged within a recess formed in a body rigidly connected to a portion of said traverse spaced apart from said fixed portions, said traverse being pivoted, at said fixed portions, on the ends of a pair of tie rods, the other ends of these tie rods being connected to corresponding levers which actuate said brakes, said tie rods being freely slidable according to a reciprocating motion within two respective spaced apart tubular guides integral to the trailer or semitrailer, said antitheft device also comprising a non-return valve connected to the service brake circuit and a latch control member operable by a key or the like, which simultaneously acts on the threaded rod and on the non-return valve, locking, in one position thereof, the axial movement of the threaded rod in the block and the brake circuit and restoring, in a second position thereof, the possibility of movement of the threaded rod and the brake circuit.

2. An antitheft device according to claim 1, characterized in that said threaded rod is provided at its median portion with an annular groove into which one end of the latch is designed to be fitted under conditions of braking in action, the other end of said latch being at the same time in a position suitable to allow the brake fluid to flow in one direction only.

3. An antitheft device according to claim 1, characterized in that the free end of said threaded rod has a polygonal-section head where a wrench allowing the manual actuation of the brakes can be inserted.

4. An antitheft device according to claim 1, characterized in that each of said tie rods comprises a first and a second threaded head joined together by means of an internally threaded adjustment sleeve and a chain connected at one end to one extreme limit of the second threaded rod and, at the other end, to the control lever of the corresponding brake.

* * * * *